United States Patent
Yamamoto et al.

(10) Patent No.: US 9,257,241 B2
(45) Date of Patent: Feb. 9, 2016

(54) FALLING-OFF STRUCTURE OF OPERATIONAL SWITCH FOR VEHICLE

(71) Applicant: MAZDA MOTOR CORPORATION, Hiroshima (JP)

(72) Inventors: Keiichirou Yamamoto, Higashihiroshima (JP); Yohichi Yanagi, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 118 days.

(21) Appl. No.: 14/172,759

(22) Filed: Feb. 4, 2014

(65) Prior Publication Data

US 2014/0216904 A1   Aug. 7, 2014

(30) Foreign Application Priority Data

Feb. 5, 2013  (JP) ................. 2013-020440

(51) Int. Cl.
| | |
|---|---|
| *H01H 9/02* | (2006.01) |
| *B60K 1/00* | (2006.01) |
| *B60R 21/09* | (2006.01) |
| *H01H 25/04* | (2006.01) |
| *B60R 21/055* | (2006.01) |
| *B60K 37/06* | (2006.01) |
| *H01H 25/06* | (2006.01) |
| *H01H 3/02* | (2006.01) |

(52) U.S. Cl.
CPC .. *H01H 9/02* (2013.01); *B60K 1/00* (2013.01); *B60K 37/06* (2013.01); *B60R 21/055* (2013.01); *B60R 21/09* (2013.01); *H01H 25/04* (2013.01); *B60K 2350/102* (2013.01); *H01H 25/06* (2013.01); *H01H 2003/026* (2013.01); *H01H 2003/0286* (2013.01); *H01H 2221/016* (2013.01); *H01H 2231/026* (2013.01)

(58) Field of Classification Search
CPC ............. B60K 2350/946; B60K 37/06; B60R 2011/0071
USPC ................................... 200/293–296
See application file for complete search history.

(56) References Cited

U.S. PATENT DOCUMENTS

| | | | | |
|---|---|---|---|---|
| 6,600,118 | B2* | 7/2003 | Altmann | 200/295 |
| 8,410,382 | B2* | 4/2013 | Yuasa | 200/296 |
| 2006/0283285 | A1* | 12/2006 | Yabashi et al. | 74/553 |
| 2011/0084509 | A1* | 4/2011 | Jones | 296/24.34 |
| 2015/0030319 | A1* | 1/2015 | Matori | 396/419 |

FOREIGN PATENT DOCUMENTS

| | | |
|---|---|---|
| JP | 04-060740 U | 5/1992 |
| JP | 2003-011744 A | 1/2003 |

* cited by examiner

*Primary Examiner* — Renee Luebke
*Assistant Examiner* — Ahmed Saeed
(74) *Attorney, Agent, or Firm* — Studebaker & Brackett PC (57) ABSTRACT

A switch body portion attached to a center console includes a dial switch. The switch body portion is held on the side of the enter console for attachment through engaging of front engagement portions and a rear engagement portion. When an external force having a specified magnitude or greater acts on the dial switch from the rear, the engaging of the front engagement portions is released, so that the switch body portion falls off downward, rotating around the rear engagement portion. Accordingly, an impact which may occur when some object hits against the dial switch projecting upward from an upper face of the center console from the rear can be properly absorbed.

6 Claims, 9 Drawing Sheets

FALLING-OFF STRUCTURE OF OPERATIONAL SWITCH FOR VEHICLE

BACKGROUND OF THE INVENTION

The present invention relates to a falling-off structure of an operational switch for a vehicle.

Some automotive vehicles have been recently equipped with a dial type of operational portion which is provided at a center console to project upward from an upper face of the center console, whereby a display operation, for example, can be conducted through a rotational operation or the like of this dial type of operational portion. In general, the above-described dial type of operational portion is considerably large and also projects upward from the upper face of the center console greatly.

Japanese Patent Laid-Open Publication No. 2003-11744 discloses a structure, in which a switch operational portion which is arranged on a vertical face extending vertically at an instrument panel is configured to move toward the inside of the instrument panel (i.e., forward) when receiving a large load from the rear.

Further, Japanese Utility Model Laid-Open Publication No. H4-60740 discloses a structure, in which a remote-control switch operational portion is arranged on an upper face of a center console portion positioned between a driver's seat and a passenger seat (assistant seat).

Herein, there is a possibility that some object (a baggage or a passenger which are located on a rear seat, for example) may hit against the above-described dial type of operational portion projecting upward from the upper face of the center console from the rear in a vehicle frontal collision or the like, so that it is desired to absorb an impact acting on the object.

SUMMARY OF THE INVENTION

The present invention has been devised in view of the above-described matter, and an object of the present invention is to provide a falling-off structure of an operational switch for a vehicle which can properly absorb the impact which may occur when some object hits against the dial type of operational portion projecting upward from the upper face of the center console from the rear.

According to the present invention, there is provided a falling-off structure of an operational switch for a vehicle, comprising a switch body portion provided to be attachable to a center console, the switch body portion including a dial type of operation portion projecting upward from an upper face of the center console, and front and rear engagement portions provided to hold the switch body portion at the center console for attachment through their engaging, wherein the front and rear engagement portions are configured such that when an external force having a specified magnitude or greater (i.e., a large external force) acts on the dial type of operation portion of the switch body portion from the rear, the engaging of the front engagement portion is released so as to allow the switch body portion to fall off downward, rotating around the rear engagement portion.

According to the present invention, since the switch body portion falls off downward, rotating around the rear engagement portion, together with the dial type of operational portion when some object hits against the dial type of operational portion from the rear in a vehicle frontal collision, for example, an impact which may be caused by the collision can be absorbed properly. Further, since the switch body portion falling off downward rotates around the rear engagement portion, the downward falling off of the switch body portion can be more properly ensured and also the direction of falling off of the switch body portion can be more desirably set, compared with a case in which the switch body portion falling off downward does not rotate.

According to an embodiment of the present invention, an upper panel which has a through hole into which the dial type of operation portion is inserted is fixed to the center console such that an outer peripheral edge portion of the upper panel is continuous to an upper face of the center console substantially flatly, and the switch body portion is configured to be held at the upper panel via the front and rear engagement portions and such that when the external force having the specified magnitude or greater acts on the dial type of operation portion of the switch body portion from the rear, the engaging of the front engagement portion is released, keeping a state of the upper panel being fixed to the center console, so as to allow the switch body portion to fall off downward, rotating around the rear engagement portion. In this case, the switch body portion is configured to constitute a set body together with the upper panel and fall off downward from the upper panel. Accordingly, the above-described embodiment is of more practical use, compared with a case in which the switch body portion is directly held at the center console which is a considerably large-sized component.

According to another embodiment of the present invention, the front engagement portion is positioned at a front end portion of the switch body portion and the rear engagement portion is positioned at a rear end portion of the switch body portion, whereby the front and rear engagement portions are arranged apart from each other in a vehicle longitudinal direction. In this case, when a passenger who operates the dial type of operation portion inadvertently puts a large downward load onto the dial type of operation portion or its surrounding area, this downward load is stably received at the front engagement portion and the rear engagement portion, so that it can be properly prevented that the switch body portion inadvertently falls off downward from its specified use position.

According to another embodiment of the present invention, the front engagement portion is located at the level which is lower than the rear engagement portion. In this case, when the above-described external force (i.e., the large external force) acts on the dial type of operation portion from the rear, this external force is transmitted to the front engagement portion as a large moment, so that the engaging of the front engagement portion can be released surely. Herein, since the rear engagement portion is located at a relatively high level, the switch body portion can be made fall off to a lower position promptly when the switch body portion falls off downward, rotating around the rear engagement portion.

According to another embodiment of the present invention, the front engagement an engagement face of the front engagement portion is configured to slant forward and downward. In this case, the releasing of the engaging of the front engagement portion can be done surely.

According to another embodiment of the present invention, the front engagement portion comprises an engagement hole which is formed on either side of the center console and the switch body portion, and an engaging pawl which is formed on the other side. In this case, the front engagement portion can be properly constituted by a simple and general structure comprising the engagement hole and the engaging pawl.

According to another embodiment of the present invention, the switch body portion further includes plural switch operation portions which are exposed at the upper face of the center console around the dial type of operation portion, and a projection height of the dial type of operation portion is configured to be greater than that of the plural switch operation portions. In this case, some object is made to surely hit against the dial type of operation portion from the rear, so that the switch body portion can be made to fall off surely.

Other features, aspects, and advantages of the present invention will become apparent from the following description which refers to the accompanying drawings.

DETAILED DESCRIPTION OF THE INVENTION

Hereinafter, preferred embodiments of the present invention will be described specifically referring to the accompanying drawings.

Figure 1:
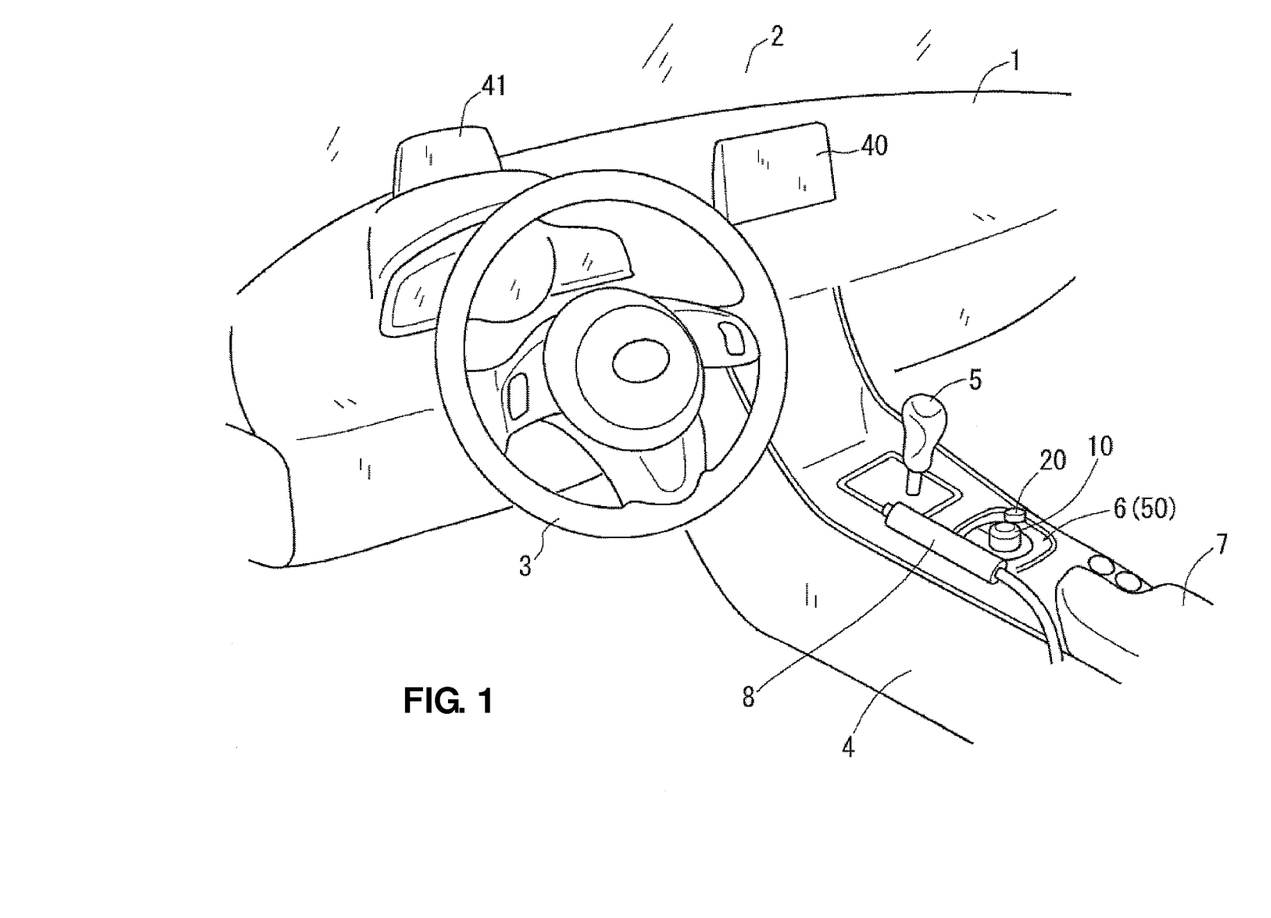
FIG. 1 is a major-part perspective view showing around a center console according to an embodiment of the present invention.

In FIG. 1 showing a portion near a driver's seat of an automotive vehicle as a vehicle, reference numeral 1 denotes an instrument panel, reference numeral 2 denotes a windshield, and reference numeral 3 denotes a steering wheel. A vehicle equipped with the steering wheel which is arranged on the left side is illustrated in FIG. 1.

A front end portion of a center console 4 which extends in a vehicle longitudinal direction is connected to a central portion, in a vehicle width direction, of the instrument panel 1. On the center console 4 are provided, in order from the vehicle front side to the vehicle rear side, an operational knob for transmission shifting 5, a switch device 6, and an armrest 7. A parking brake lever 8 is arranged at a specified portion of the center console 4 which is located on the side of steering wheel 3.

Figure 2:
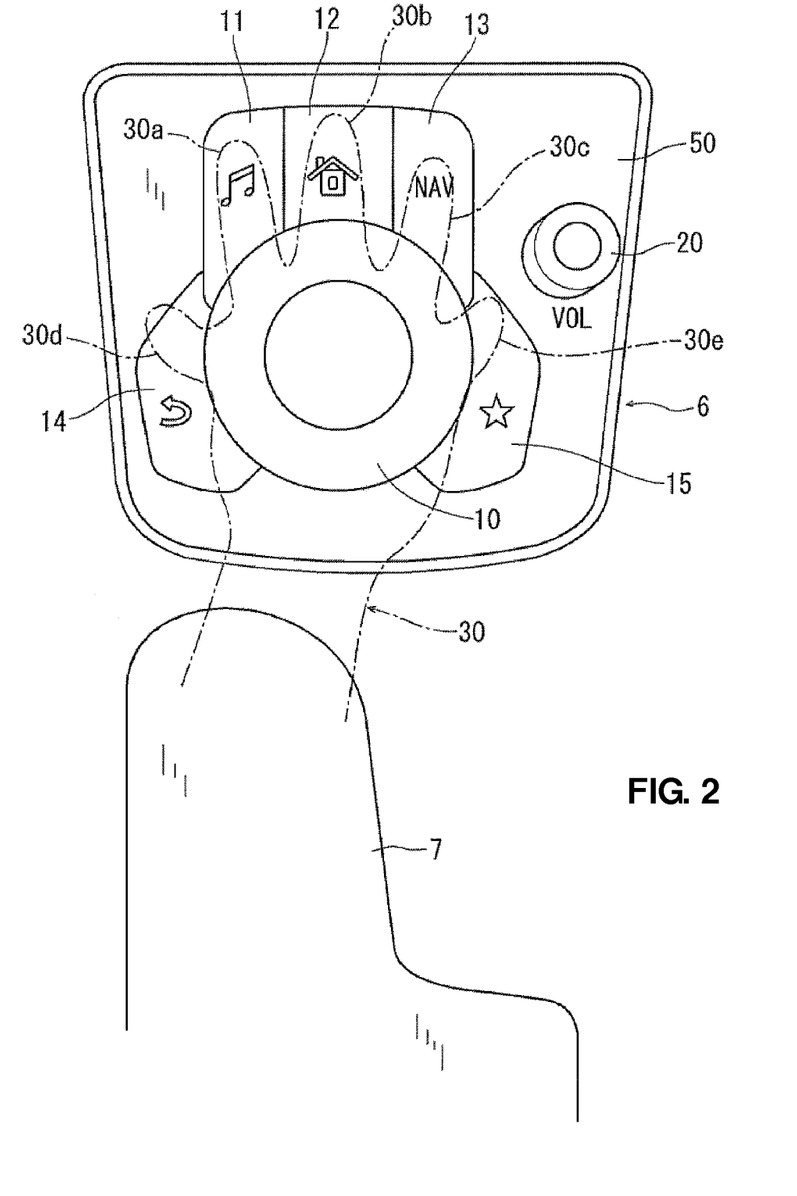
FIG. 2 is a diagram showing a state in which switches provided on the center console are operated by an arm placed onto an armrest.

The details of the above-described switch device 6 are shown in FIG. 2. The switch device 6 comprises plural switches (switch operation portions) as described below. First, the switch device 6 includes a dial switch 10 which is a dial type of operation portion. And, three pressing switches 11, 12, 13 are arranged right before the dial switch 10 to extend in the vehicle width direction. Further, a pressing switch 14 is provided right beside the idle switch 10 on the left side, and also a pressing switch 15 is provided right beside the idle switch 10 on the right side.

The switch device 6 further includes a sound-volume adjusting switch 20. This switch 20 is arranged on the right side of the above-described switches 11-13. That is, the sound-volume adjusting switch 20 is positioned on the opposite side to the steering wheel 3 and the parking brake lever 8 relative to the dial switch 10.

The dial switch 10 is configured to be operable in a rotational motion, a longitudinal-and-lateral tilt motion, and a pressing motion, and also is formed substantially in a columnar shape, having a projection height of about 2-3 cm, for example. Further, the dial switch 10 has a large diameter (which may be equal to the total width of 2-4 fingers of an adult, i.e., about 4-6 cm, for example) so that the dial switch 10 can be easily rotated by a hand with a palm placed on the dial switch 10 or by tips of three fingers of a thump, a forefinger and a middle finger.

Meanwhile, the sound-volume adjusting switch 20 is configured to be adjustable by its rotation as well. This switch 20 is formed substantially in a columnar shape, having a projection height of about 2-3 cm, for example, which is slightly shorter than the dial switch 10 though. The sound-volume adjusting switch 20 has a relatively small diameter (which may be equal to the width of a single finger of the adult, i.e., about 1-2 cm, for example) so that the sound-volume adjusting switch 20 can be easily rotated by hand's fingers (the thump and the forefinger, mainly). The sound-volume adjusting switch 20 is located near the dial switch 10 such that a small gap is created between the dial switch 10 and the switch 20. However, this small gap is set to be so wide (about 2-3 cm, for example) that the finger (a single finger of the adult) may not be stuck therein improperly.

The pressing switches 11-15 are configured such that the height thereof is sufficiently small (about 2-5 mm, for example), compared with the dial switch 10 or the sound-volume adjusting switch 20. Further, each of the pressing switches 11-15 is configured to have a relatively wide area (about 1.5-2.0 cm in width and 2-3 cm in length, for example) so that each switch can be easily operated to be pressed down by a single finger. However, the centrally-located pressing switch 12 is provided as a home switch which is generally used very often as described later, so this switch 12 is configured such that its width and projection height are greater that those of the other pressing switches 11, 13. Herein, this switch 12 may be designed so as to be easily differentiated from the other switches 11, 13 by forming a recess or projection on its upper face or the like.

The dial switch 10 and a front end of the armrest 7 are located at a relatively low level. Specifically, as shown in FIG. 2, when a driver's arm 30 (a right hand in the embodiment) is placed on the armrest 7 with its wrist being bent downward and its elbow being fixed, the palm is positioned right above the dial switch 10 and also a joint portion of a finger is positioned at a front end portion of the dial switch 10.

As shown in FIG. 2, the pressing switch 11 is configured to be easily pressed down operationally by a forefinger 30a with its tip bent downward slightly when the palm contacts the dial switch 10. Likewise, the pressing switch 12 is configured to be easily pressed down operationally by a middle finger 30b. The pressing switch 13 is configured to be easily pressed down operationally by a third finger 30c. The pressing switch 14 is configured to be easily pressed down operationally by a thumb 30d. The pressing switch 15 is configured to be easily pressed down operationally by a little finger 30e. Thus, by providing the switches 11-15 associated with the position and number of the fingers, a driver can easily and effectively operate the respective pressing switches 11-15.

The upper faces of the respective switches 10-15, 20 are located below the level of the upper face of the armrest 7 (the upper face of the dial switch 10 is about 3-10 cm lower than the upper face of the tip end portion of the armrest 7, for example). Accordingly, the switches 10-16 are operable in a state in which the driver's arm 30 is placed on the armrest 7 and a hand portion located forward from the wrist hangs down. The sound-volume adjusting switch 20 is operable by a tip of the hand portion which is slightly moved clockwise around the wrist in FIG. 2.

Returning to FIG. 1, a thin type of display (indication picture plane) 40, such as a liquid-crystal display, is provided on a central portion, in the vehicle width direction, of the instrument panel 1. Further, a head-up display 41 is arranged on the instrument panel 1 at a specified position which is located right in front of the steering wheel 3. These displays 40, 41 are positioned properly visibly from the driver.

The above-described switches 10-15 of the present embodiment are provided to operate an indication on the display 40. Specifically, the dial switch 10 operates a rotational motion, a longitudinal-and-lateral tilt motion, and a pressing motion so that a specified item can be selected from plural items indicated on the display 40 through the rotational motion and the longitudinal-and-lateral tilt motion, and then indication corresponding to the selected item can be executed on the display 40 through the pressing motion. Further, the pressing switches 11-15 are configured, respectively, as a shortcut key which can switch the indication on the display 40 to a predetermined specified one at one time.

Figure 3:
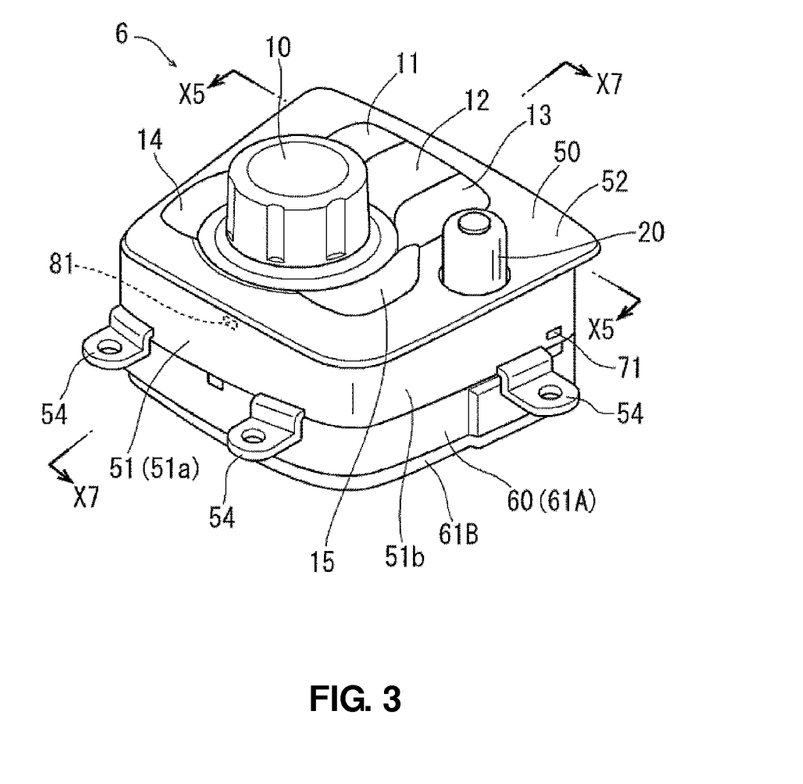
FIG. 3 is a perspective view showing an assembly state of a set body comprised of an upper panel and a switch body portion.
Figure 4:
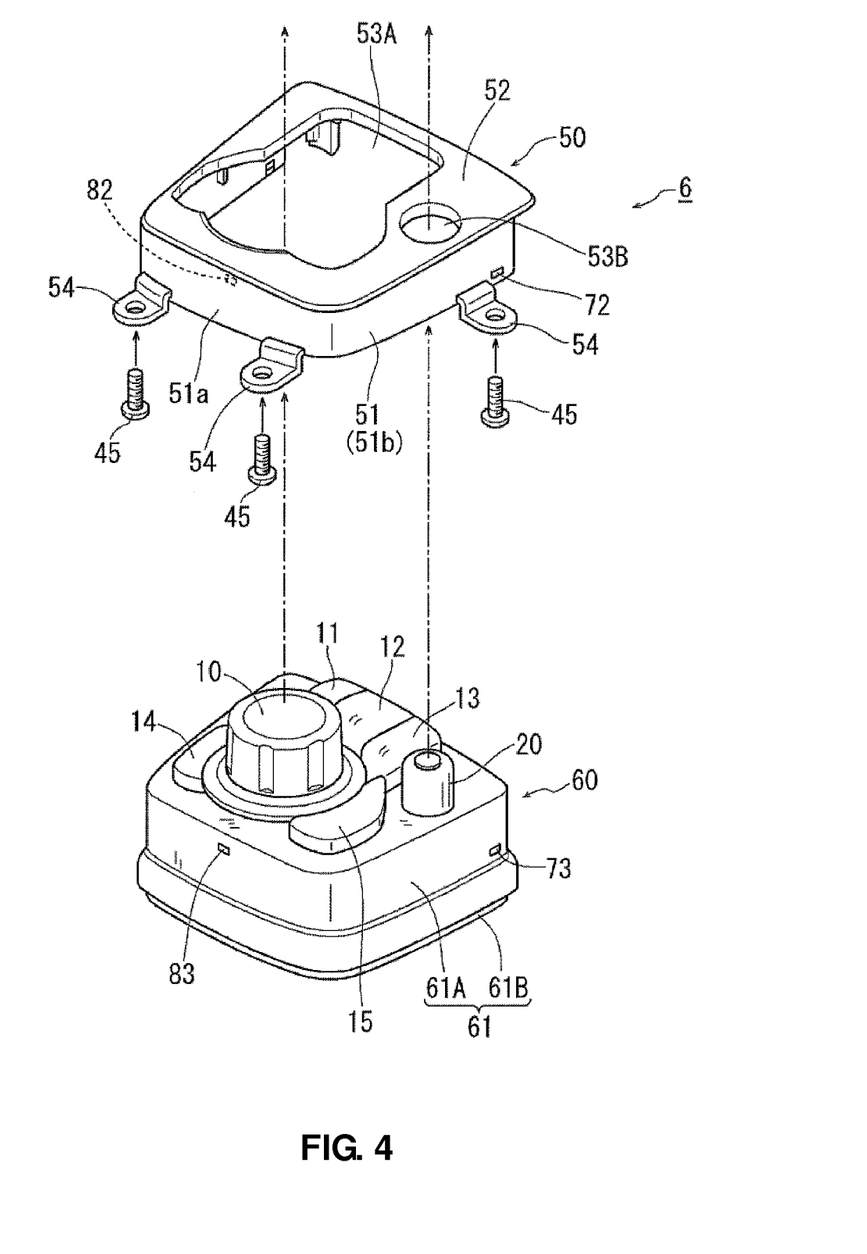
FIG. 4 is an exploded perspective view showing the upper panel and the switch body portion.

Next, the details of the switch device 6 will be described referring to FIG. 3 and others. First, the switch device 6 comprises, as shown in FIG. 4, an upper panel 50 and a switch body portion 60 which are formed separately from each other. The upper panel 50, which is made from synthetic resin, includes an upper face portion 52 and a ring-shaped vertical wall portion (tube portion) 51 which extends downward from an entire peripheral edge portion of the upper face portion 52. Opening portions 53A, 53B are formed at the upper face portion 52.

Plural attachment side portions 54 are integrally formed with a lower end portion of the vertical wall portion 51 of the upper panel 50. The upper panel 50 is firmly fixed to the center console 4 by using screws 45 inserted into the attachment side portions 54. Specifically, an attachment boss portion (not illustrated) which is of a columnar shape and extends downward is formed at the synthetic-resin-made center console 4. The screws 45 are screwed into the attachment boss portion in a state in which the above-described attachment side portions 54 are seated on a lower face of the attachment boss portion. Consequently, the upper panel 50 is firmly connected to the center console 4. Herein, the attachment side portions 54 are arranged at in total four points of right-and-left two points of a rear face portion 51*a* and two points of front end portions of right-and-left side face portions 51*b*.

The center console 4 has an attachment hole 4*a* for attaching the switch device 6, and an outer peripheral edge portion of the upper panel 50 (the upper face portion 50*c*) is continuous to the upper face (an inner peripheral edge portion of the attachment hole 4*a*, in particular) of the center console 4 substantially flatly (the upper panel 50 constitutes part of the upper face of the center console 4) in a state in which the upper panel 50 is attached to the center console 4.

The switch body portion 60 is formed in a box shape as a whole, and includes the above-described switches 10-15, 20. The switch body portion 60 is inserted into the vertical wall portion 51 to a specified depth position such that the switches 10-15 project upward (are exposed) through the opening portion 53A of the upper panel 50 and the switch 20 projects upward (are exposed) through the opening portion 53B of the upper panel 50 as shown in FIG. 3. Accordingly, the respective switches 10-15, 20 are operable by the passenger.

Figure 5:
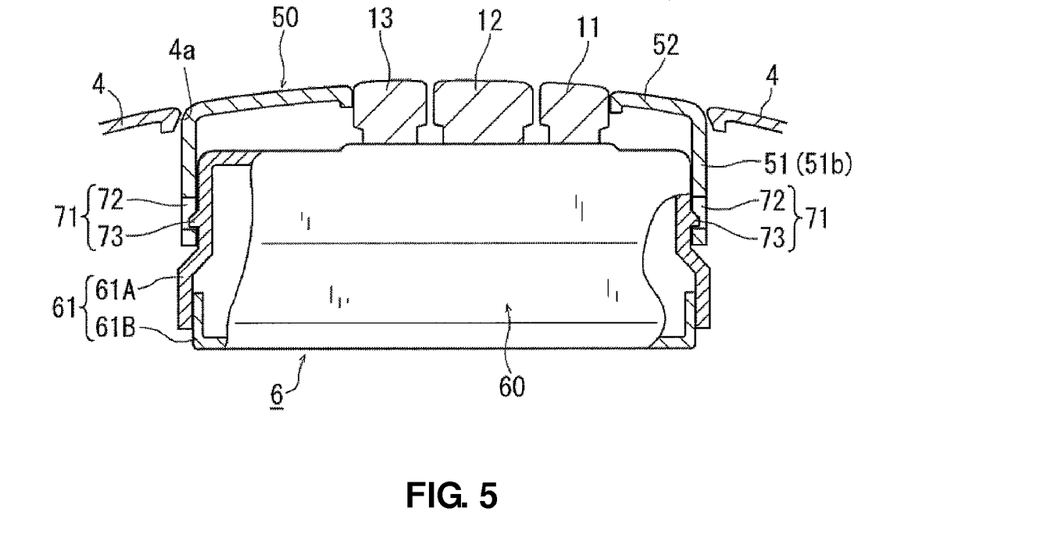
FIG. 5 is a partial sectional view taken along line X5-X5 of FIG. 3.

A casing 61 which constitutes a shell portion of the switch body portion 60 is, as shown in FIG. 5, for example, comprised of an upper casing 61A which opens downward and a lower casing 61B which opens upward, which are firmly connected together. The casings 61A, 61B are made from synthetic resin, and firmly connected to each other by screws, adhesive agent, or the like. Switch contact portions and the like which correspond to the respective switches (switch operational portions) 10-15, 20 are arranged inside the casing 61. Herein, illustrations of cables which extend from the switch body portion 60 and the like are omitted.

The upper panel 50 and the switch body portion 60 are integrally assembled together by engagement of a front engagement portion 71 and a rear engagement portion 81. In the present embodiment, the front engagement portion 71 is comprised of a pair of right-and-left portions, whereas the rear engagement portion 81 is comprised of a single portion.

Figure 6:
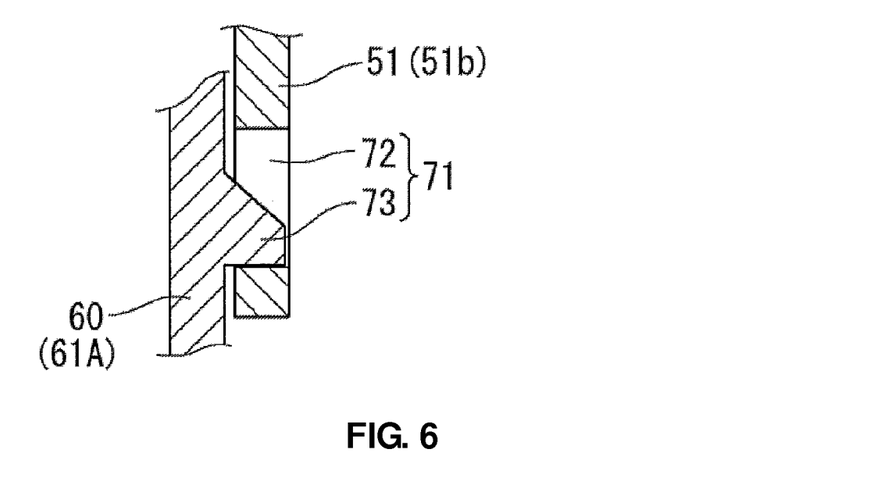
FIG. 6 is a sectional view specifically showing a front engagement portion shown in FIG. 5.

Each of the pair of right-and-left front engagement portions 71 comprises an engagement hole and an engaging pawl. That is, as shown in FIGS. 5 and 6, engagement holes 72 are formed at a pair of right-and-left side face portions 51*b* of the vertical wall portion 51 of the upper panel 50. Engaging pawls 73 are formed at right-and-left side face portions of the upper housing 61A of the switch body portion 60, corresponding to the engagement holes 72. The engaging pawls 73 are engaged with (inserted into) the engagement holes 72, so that the upper panel 50 and the switch body portion 60 are connected via the front engagement portions 71. The front engagement portions 71 comprising the engagement holes 72 and the engaging pawls 73 are formed at a lower position of a front end portion of the vertical wall portion 51 (the switch body portion 60).

Figure 7:
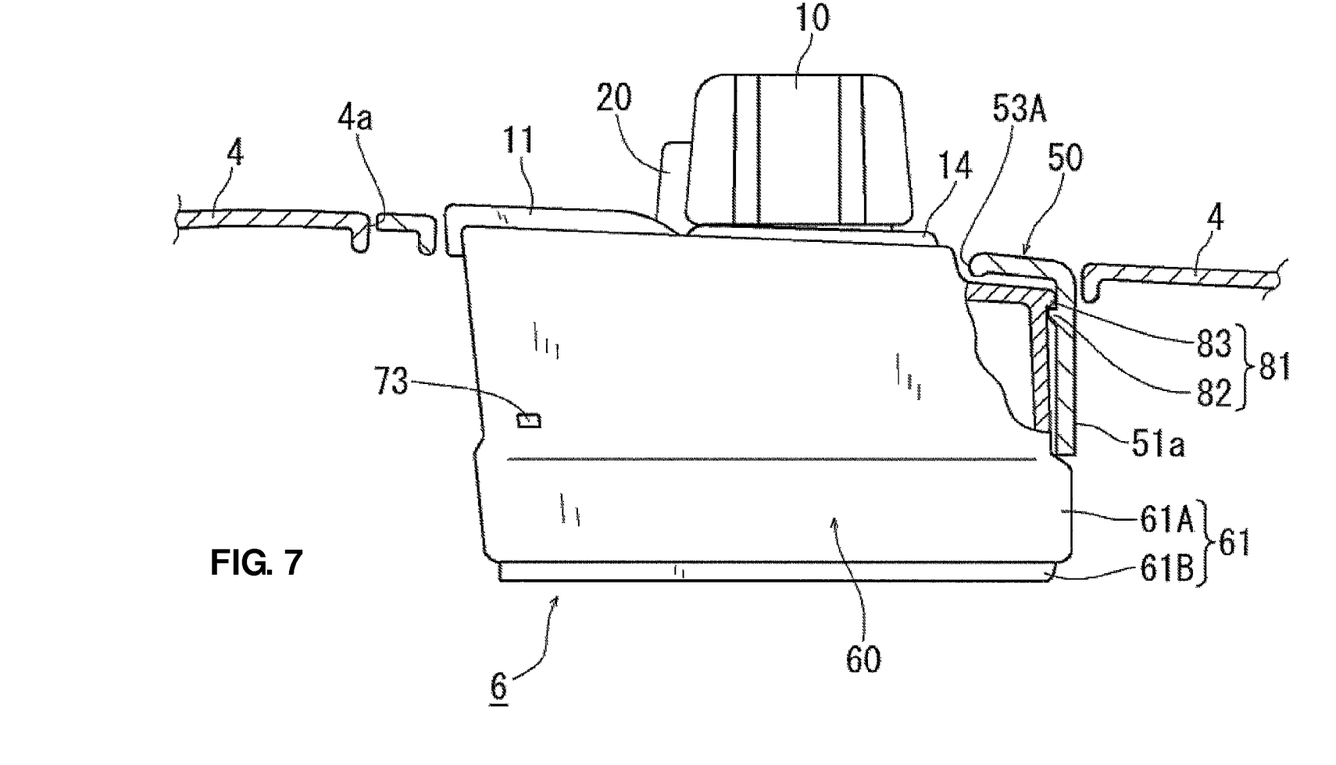
FIG. 7 is a partial sectional view taken along line X7-X7 of FIG. 3.
Figure 8:
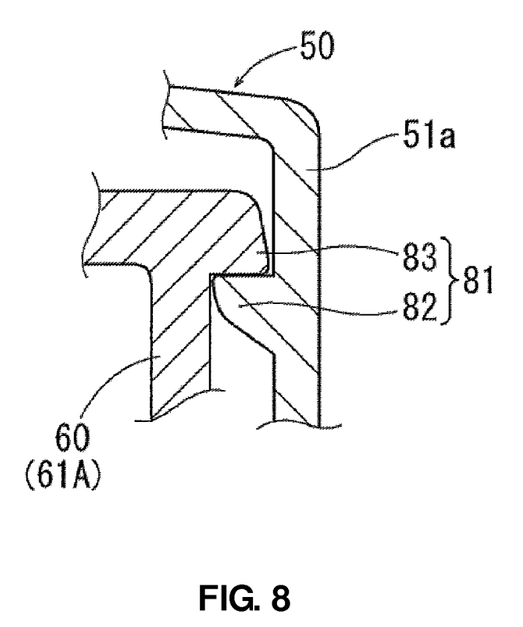
FIG. 8 is a sectional view specifically showing a rear engagement portion shown in FIG. 7.

The rear engagement portion 81 comprises a pair of engaging pawls. That is, as shown in FIGS. 7 and 8, an engaging pawl 82 is formed at an inner face of the rear face portion 51*a* of the vertical wall portion 51 of the upper panel 50. Another engaging pawl 83 is formed at a rear face of the upper casing 61A of the switch body portion 60, corresponding to the engagement pawl 82. The engaging pawl 83 is configured to be engaged with the engaging pawl 82 through a contact from above. The rear engagement portion 81 is formed at a central and high position of the switch body portion 60.

The upper panel 50 and the switch body portion 60 which are engaged with each other via the front engagement portions 71 and the rear engagement portion 81 are normally in a use state shown in FIGS. 5 and 7. Herein, the engagement portions 71, 81 are configured such that the engaging of the engagement portions 71, 81 is not released by a relatively-small downward load which may be applied when the passenger just puts the hand onto the dial switch 10, so that the above-described normal use state of the upper panel 50 and the switch body portion 60 can be kept. In the present embodiment, the engagement portions 71, 81 are configured so that this normal use state can be kept until the downward load of 170N applied to the dial switch 10. It is preferable that the above-described resistant downward load be set in a range of about 150-200N.

Since the front engagement portions 71 and the rear engagement portion 81 are arranged properly apart from each other in the vehicle longitudinal direction, the switch body portion 60 can be stably held at the upper panel 50, i.e., the center console 4, even if the operational force is applied to the dial switch 10.

Figure 9:
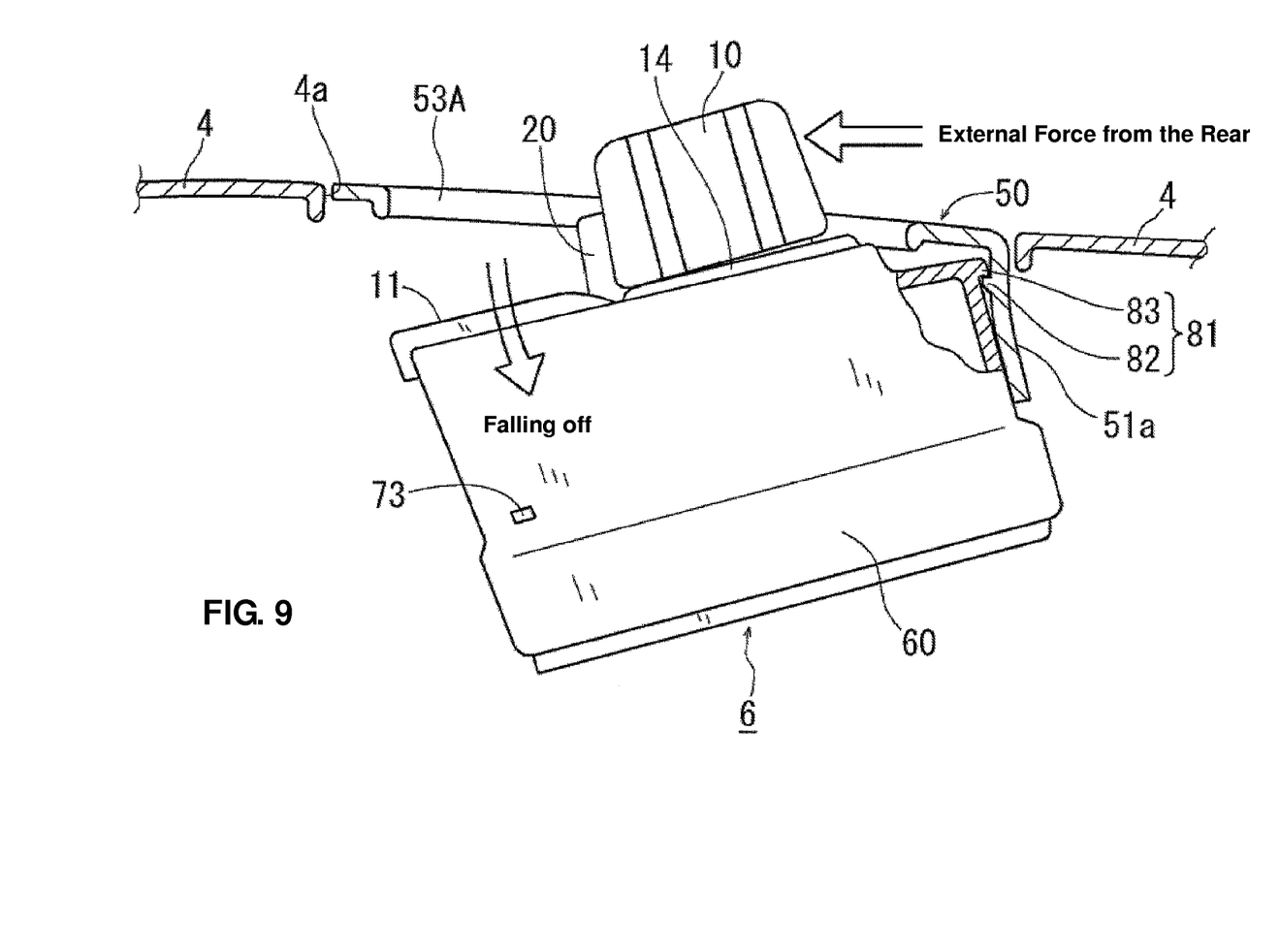
FIG. 9 is a diagram showing a state in which the switch body portion falls off downward, rotating around the rear engagement portion, which corresponds to the partial sectional view of FIG. 7.

Herein, let us consider a case in which some object is forced to move forward, thereby hit against the dial switch 10 in a vehicle frontal collision, for example. In this case, when an external force having a specified magnitude or greater (i.e., a large external force) acts on the dial switch 10 from the rear, the engaging of the front engagement portions 71 is released. That is, the engaging pawls 73 are forced to come out of the engagement holes 72, so that the upper panel 50 and the switch body portion 60 are disconnected from each other at their front end portions. Consequently, as shown in FIG. 9, the switch body portion 60 falls off downward from the upper panel 50, i.e., the center console 4, rotating around the rear engagement portion 81. Herein, an enough space to receive the switch body portion 60 falling off downward is formed inside the center console 4. The above-described specified magnitude of the external force (specified load) is set at 330N in the present embodiment, but it is preferable that this specified magnitude of the external force be set within the range of 250-400N, more preferably the range of 300-350N.

Since the rear engagement portion 81 is located at a relatively high level, the switch body portion 60 can fall off downward from its normal use position (see FIGS. 5 and 7) promptly as a whole, without causing any greatly upward-moving of a portion thereof.

Figure 10:
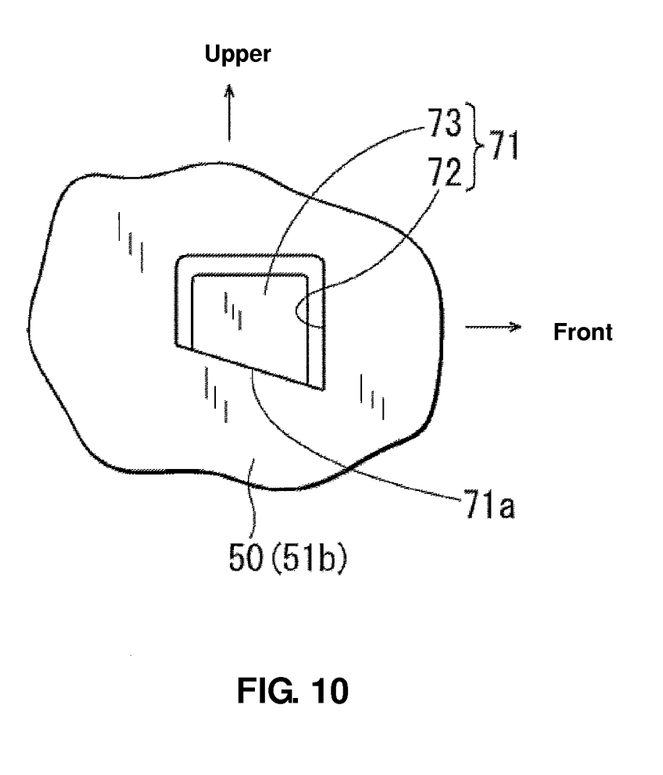
FIG. 10 is a side view showing a modification of the front engagement portion.

FIG. 10 shows a modification of the front engagement portion 71. According to this modification of the front engagement portion 71, a bottom face of the engagement hole 72 and a bottom face of the engaging pawl 73 are configured as a slant face 71a which gradually slants forward and downward. By forming this slant face 71a, the engaging of the front engagement portion 71 can be released more surely when the external force having the specified magnitude or greater acts on the dial switch 10 from the rear.

The present invention should not be limited to the above-described embodiments, and any other modifications or improvements may be applied within the scope of the claimed invention. The switch body portion 60 and the upper panel 50 may be formed as a firm integrally-formed member and the respective engagement portions 71, 81 are positioned between this firm integrally-formed member 50, 60 (specifically, the upper panel 50) and the center console 4 such that the firm integrally-formed member 50, 60 falls off downward from the center console 4 when the external force having the specified magnitude or greater acts from the rear. The front engagement portion 71 may be configured such that the engagement portion 72 is formed on the side of the switch body portion 60 and the engaging pawl 73 is formed on the side of the upper panel 50. The rear engagement portion 81 may be comprised of two or more members provided on the right and left sides. The rear engagement portion 81 may comprise an engagement hole which is formed on either side of the upper panel 50 and the switch body portion 60, and an engaging pawl which is formed on the other side. The constitution of the front engagement portion 71 and the rear engagement portion 81 may be selectable at need. For example, the switch body portion 60 may be connected to the center console 4 via a breakable member which gets broken when receiving the external force having the specified magnitude or greater from the rear, a front edge portion of the engagement hole 72 of the front engagement portion 71 (or the engaging pawl 73 engaging the above-described front edge portion) may be configured to get broken when receiving the external force having the specified magnitude or greater from the rear, or the like. No switches, such as the switches 11-15, 20, may be provided. Of course, the purpose of the present invention includes providing all structures which are described not only explicitly but implicitly as a substantially preferable or advantageous one.

What is claimed is:

1. A falling-off structure of an operational switch for a vehicle, comprising:
   a switch body portion provided to be attachable to a center console, the switch body portion including a dial type of operation portion projecting upward from an upper face of the center console; and
   front and rear engagement portions provided to hold the switch body portion at the center console for attachment through their engaging,
   wherein said front and rear engagement portions are configured such that when an external force having a specified magnitude or greater acts on the dial type of operation portion of said switch body portion from the rear, the engaging of the front engagement portion is released so as to allow the switch body portion to fall off downward, rotating around said rear engagement portion,
   an upper panel which has a through hole into which said dial type of operation portion is inserted is fixed to the center console such that an outer peripheral edge portion of the upper panel is continuous to an upper face of the center console substantially flatly, and said switch body portion is configured to be held at the upper panel via said front and rear engagement portions and such that when the external force having the specified magnitude or greater acts on the dial type of operation portion of the switch body portion from the rear, the engaging of the front engagement portion is released, keeping a state of the upper panel being fixed to the center console, so as to allow the switch body portion to fall off downward, rotating around the rear engagement portion.

2. The falling-off structure of an operational switch for a vehicle of claim 1, wherein said front engagement portion is positioned at a front end portion of the switch body portion and said rear engagement portion is positioned at a rear end portion of the switch body portion, whereby the front and rear engagement portions are arranged apart from each other in a vehicle longitudinal direction.

3. The falling-off structure of an operational switch for a vehicle of claim 2, wherein said front engagement portion is located at the level which is lower than said rear engagement portion.

4. The falling-off structure of an operational switch for a vehicle of claim 1, wherein an engagement face of said front engagement portion is configured to slant forward and downward.

5. The falling-off structure of an operational switch for a vehicle of claim 1, wherein said front engagement portion comprises an engagement hole which is formed on either side of said center console and said switch body portion, and an engaging pawl which is formed on the other side.

6. The falling-off structure of an operational switch for a vehicle of claim 1, wherein said switch body portion further includes plural switch operation portions which are exposed at the upper face of the center console around the dial type of operation portion, and a projection height of the dial type of operation portion is configured to be greater than that of said plural switch operation portions.

* * * * *